United States Patent
Hilliar Isaacson

(10) Patent No.: US 8,098,151 B2
(45) Date of Patent: Jan. 17, 2012

(54) METHOD OF SHARING POSITION INFORMATION IN PERSONAL NAVIGATION DEVICES

(75) Inventor: Thomas Edward Hilliar Isaacson, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 412 days.

(21) Appl. No.: 12/420,811

(22) Filed: Apr. 8, 2009

(65) Prior Publication Data

US 2010/0262360 A1    Oct. 14, 2010

(51) Int. Cl.
*G08B 1/08* (2006.01)

(52) U.S. Cl. ............. 340/539.13; 340/539.11; 701/200; 701/207; 701/213

(58) Field of Classification Search .............. 340/539.11, 340/539.1, 539.13, 988; 701/200, 207, 208, 701/211, 213, 29, 33
See application file for complete search history.

(56) References Cited

U.S. PATENT DOCUMENTS

| | | | |
|---|---|---|---|
| 2004/0148090 A1* | 7/2004 | Melen | 701/200 |
| 2005/0120214 A1* | 6/2005 | Yeates et al. | 713/171 |
| 2009/0320102 A1* | 12/2009 | Ou | 726/4 |
| 2011/0125403 A1* | 5/2011 | Smith | 701/213 |

* cited by examiner

*Primary Examiner* — Brent Swarthout
(74) *Attorney, Agent, or Firm* — Winston Hsu; Scott Margo

(57) ABSTRACT

A method of sharing position information of a personal navigation device (PND) with a peer PND includes the PND receiving a request from the peer PND to share the position information with the peer PND, determining a class of the peer PND, the PND filtering out a piece of the position information from the PND thereof according to the class of the peer PND to generate a filtered position information, and the PND sending the filtered position information to the peer PND.

19 Claims, 3 Drawing Sheets

|  | Spouse | Family | Friend | Classmate | Coworker | Customer |
|---|---|---|---|---|---|---|
| Country | X | X | X | X | X | X |
| State/Province | X | X | X | X | X | X |
| County | X | X | X | X | X | X |
| City | X | X | X | X | X | X |
| District | X | X | X |  | X |  |
| Street | X | X |  |  |  |  |
| Street Number | X | X |  |  |  |  |
| Zip Code | X | X | X |  |  |  |
| Longitude/Latitude | X |  |  |  |  |  |
| Route | X |  |  |  |  |  |

FIG. 3

METHOD OF SHARING POSITION INFORMATION IN PERSONAL NAVIGATION DEVICES

BACKGROUND OF THE INVENTION

1. Field of the Invention

The present invention relates to personal navigation devices (PNDs), and more particularly, to a method of sharing position information between multiple PNDs based on a hierarchy of rights.

2. Description of the Prior Art

A number of navigation methods have been employed over the centuries by sailors desiring to go from one place to another without getting lost on the way or passing through dangerous waters. Whereas in the past, navigation was typically of interest to navigators on marine vessels, as more advanced navigation systems are developed, drivers, hikers, and tourists are rapidly adopting Global Navigation Satellite System (GNSS) receivers as aids in their travels.

One key to navigation is positioning, or the art of knowing precisely where one is at any given moment. In the past, positioning was accomplished through use of a sextant, which measures angular positions of celestial bodies relative to the horizon. Today, positioning can be accomplished with fair accuracy by GNSS receivers. Currently, only the NAVSTAR Global Positioning System (GPS) developed by the United States Department of Defense offers comprehensive positioning satellite coverage around the globe, though other systems should become operational by the year 2010.

A typical GPS receiver will include an antenna for receiving electrical signals transmitted by GPS satellites, and positioning circuitry for determining a position of the GPS receiver from the electrical signals, and generating corresponding position data. The antenna can be integrated into the GPS receiver, or can be connected externally through a wire. A personal navigation device (PND) can integrate the GPS receiver and further means for providing functions that use the position data generated by the GPS receiver. Typically, the PND can be a standalone mobile device, or can be integrated into an automobile as another instrument on the dashboard. The standalone mobile device can also be adapted for use in an automobile through a mount, which can be attached to the automobile through suction cups or other more permanent means.

The PND will typically include an internal map, which can be used in conjunction with the position data to determine where the PND is located on the map. Based on this information, a navigator function of the PND can calculate a route along known roads from the position of the PND to another known location. The route can then be displayed on a display of the PND, and instructions on upcoming maneuvers can be displayed on the PND and played through a speaker of the PND to alert the user as to which maneuvers should be taken to reach their destination.

As PNDs begin to be equipped with network interface adapters, such as GPRS modems and 802.11-series wireless network adapters, real-time position and route information will be increasingly available for download on peer PNDs, as well as on Internet-connected computers and mobile devices. However, currently there is no method for users to share their real-time position and route information, and further, there is no mechanism in place for abstracting the position and route information for sharing with different classes of users. Thus, real-time position and route information may either not be accessible at all, or accessible to other users at an inappropriate level.

SUMMARY OF THE INVENTION

According to an embodiment of the present invention, a method of sharing position information of a personal navigation device (PND) with a peer PND comprises the PND receiving a request from the peer PND to share the position information with the peer PND, determining a class of the peer PND, the PND filtering out a piece of the position information from the PND thereof according to the class of the peer PND to generate a filtered position information, and the PND sending the filtered position information to the peer PND.

According to another embodiment of the present invention, a method of sharing position information of a personal navigation device (PND) with a peer PND comprises the PND receiving a request from the peer PND to share position information of a predetermined type of the PND with the peer PND, determining a class of the peer PND, and the PND sending the position information of the predetermined type to the peer PND when the class of the peer PND has access rights in the PND for the predetermined type.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a table illustrating abstraction of position and route information.

DETAILED DESCRIPTION

Figure 1:
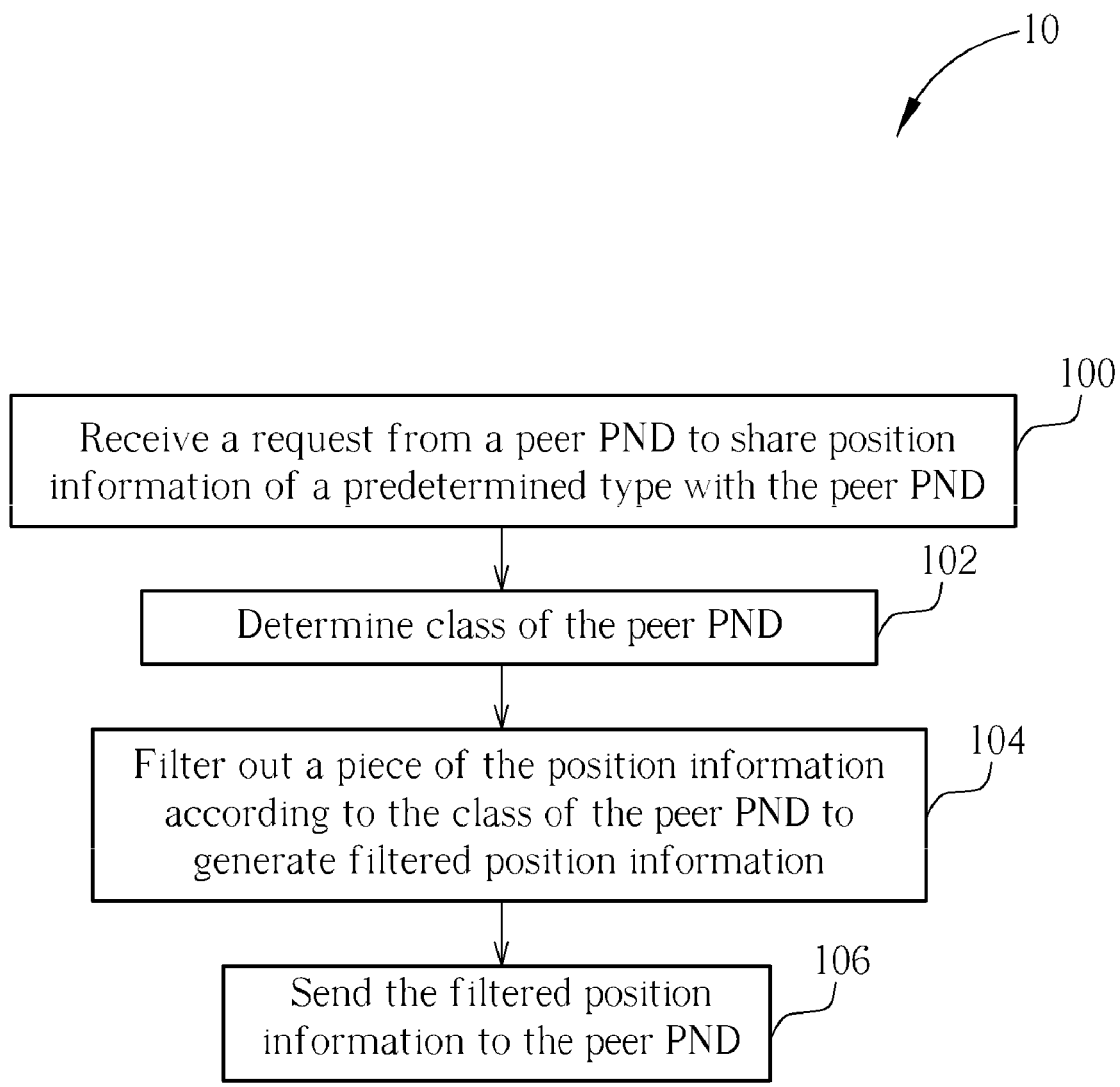
FIG. 1 is a flowchart of a method of sharing position information according to one embodiment.

Please refer to FIG. 1, which is a flowchart of a method of sharing position information of a personal navigation device (PND) with a peer PND. The PND shares the position information with the peer PND at a level deemed appropriate by a user of the PND. The method comprises receiving a request from a peer PND to share position information with the peer PND (Step 100), determining class of the peer PND (Step 102), filtering out a piece of the position information according to the class of the peer PND to generate filtered position information (Step 104), and sending the filtered position information to the peer PND (Step 106). The class may be user-defined, or the class may be defined as a preset in the PND.

Initially, the PND may determine position of the PND through use of a GNSS network, as described above. The position information may initially comprise latitude and longitude degrees determined by analyzing signals received from the GNSS network. The signals may be received from the NAVSTAR GPS system, the Galileo system, or any other system that provides global positioning signals. Methods for determining the position from the global positioning signals are well known in the art, and not further described here.

Knowing the latitude and longitude of the PND, the PND may then compare the latitude and longitude of the PND with a map database stored in the PND or accessible to the PND. Utilizing the map database, the PND may then determine types of position information, such as street number, street, district, zip code, city, county, state or province, and country. The position information may also identify location of the PND near or within a landmark. For example, if the PND is in a state park or national park, the position information may include this information. It may be that the user of the PND is visiting a museum or monument. Or, based on the map database and a corresponding landmark database, the PND may determine that it is located at a particular restaurant, stadium, concert hall, or other landmark. The position may also indicate that the PND is within some distance of a landmark, e.g. within 100 m of the Arc de Triomphe in Paris.

The user of the PND may also have inputted a route, which may be considered a type of the position information. Typically, the route will comprise a starting point, a destination address or landmark, and a plurality of streets and maneuvers to navigate to the destination address. If the user has inputted the route, this may also be considered part of the position information described above. How the route is calculated based on the starting point, the destination address or landmark, and user preferences for surface streets and freeways is well known in the art, and not described here.

The position information being known, the PND may proceed to send the position information to the peer PND (Step 104). The PND may send all of the position information to the peer PND, or just a subset. In other words, the filtered position information may include all of the position information. For example, the PND may send only the city, state or province, and country information. Or, the PND may send the name of the landmark the PND is located near or in, the name of the landmark and the distance from the landmark, or simply a phrase stating that the PND is located near the landmark, without mentioning how far away the PND is. Any combination is available. The PND may be set with a default subset of the position information to send to all peer PNDs. The default subset may be a factory preset, or may be user-defined.

To send the position information to the peer PND, a number of options are available. A first method may be broadcasting the position information to nearby peer PNDs. A second method may be uploading the position information to a server, and allowing the server to send the position information to the peer PND either periodically or upon request. A third method may be for the PND itself to send the position information to the peer PND periodically or upon request. Various types of connections are available for connecting the PND, the peer PND, and the server, including wired and wireless connections, though the latter is preferable. Wireless connections could include 802.11-type connections, or GPRS connections.

Along with the position information, the PND may also send a user name corresponding to the user, which could be determined through a login mechanism present on the PND. In this way, different users of the same PND could send different subsets of the position information to different peer users defined in the PND. In essence, the user of the PND could belong to a "social network," and use the PND to indicate to peer users in the social network the position information showing where the user of the PND is located. Of course, the user of the PND may or may not be tied to the PND through a unique hardware identifier of the PND. In other words, the user may be able to log in to another PND that allows access to the social network and is capable of sharing the position information within the social network.

After the PND has sent the position information to the peer PND, it is likely that the position information, e.g. the latitude and longitude, the location on the map, or the route, may change or be updated. The former would be changed as the user moves, and the latter may be changed if the user modifies their destination, or deviates from the maneuvers suggested for navigation. In this situation, the PND could update the information in the social network on the fly, or periodically, so that the position information is available in a fashion approaching real-time, or fully real-time.

Figure 2:
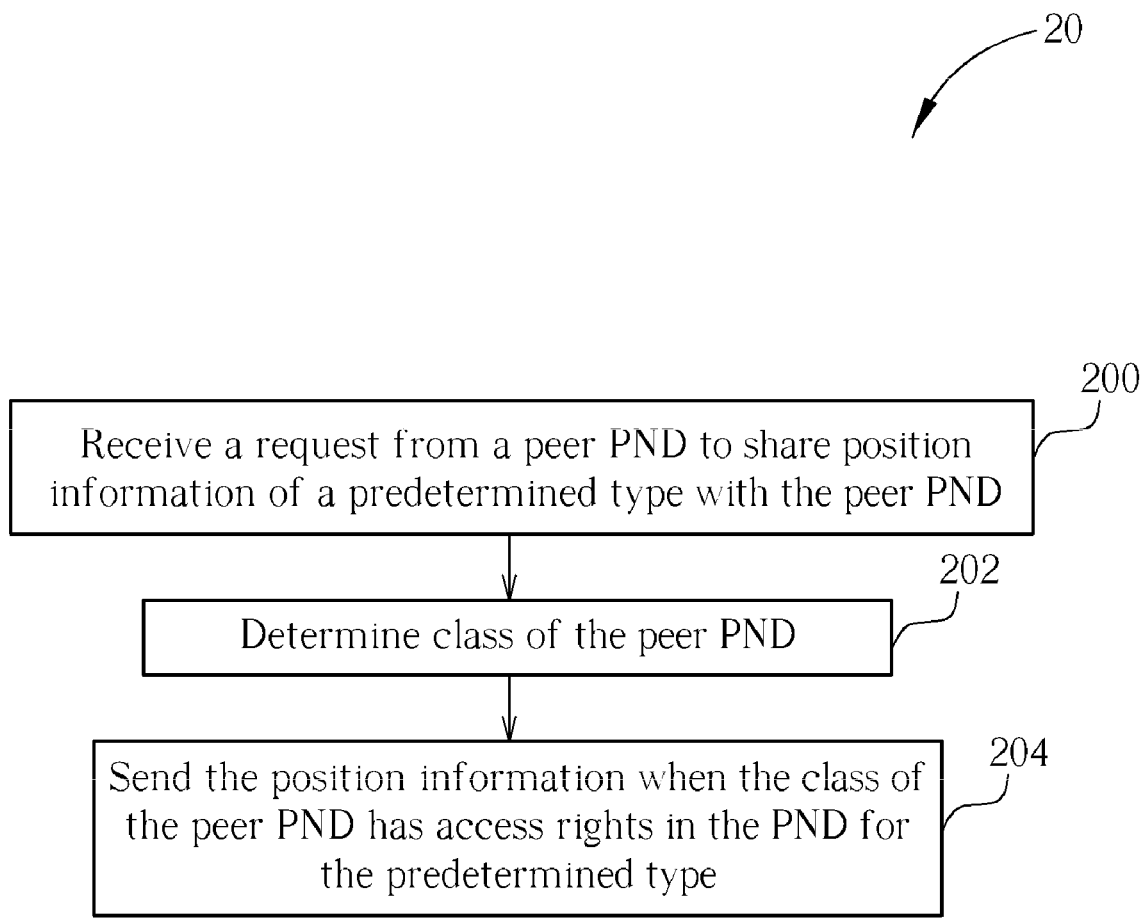
FIG. 2 is flowchart of a method of sharing position information according to a second embodiment.

Please refer to FIG. 2, which is a flowchart of a method of sharing position information according to a second embodiment. In the method shown in FIG. 2, a request from a peer PND to share position information of a predetermined type with the peer PND is received (Step 200), class of the peer PND is determined (Step 202), and the position information is sent to the peer PND when the class of the peer PND has access rights in the PND for the predetermined type (Step 204). In the method shown in FIG. 2, the predetermined type may comprise country, state, province, county, city, district, street, street number, zip code, longitude, or latitude corresponding to position of the PND. The predetermined type may comprise a current route of the PND. The PND may send the position information to a server, and the server may send the position information to the peer PND. The peer PND may send the request to the server, or directly to the PND. Likewise, the PND may receive the request from the peer PND to share the position information of the predetermined type with the peer PND from the server or directly from the peer PND. The server may determine the class of the peer PND, or the PND may determine the class of the peer PND. The peer PND may be assigned to the class by the server or the PND according to user input. When the position information changes, the PND may send updated position information of the predetermined type to the peer PND. Or, the PND may periodically send updated position information of the predetermined type to the peer PND after sending the position information of the predetermined type to the peer PND.

In the methods shown in FIG. 1 and FIG. 2, it may be advantageous to provide the user with an abstraction mechanism for quickly defining which classes of peer users are allowed to access which subset of the position information. Please refer to FIG. 3, which is a table showing various classes and subsets of the position information accessible by each of the classes. In the table of FIG. 3, the peer users are divided in the classes: Spouse, Family, Friend, Classmate, Coworker, and Customer. These classes are only representative, and could be renamed and customized by the user to fit their preferences. The user could also create new classes with access to different subsets of the position information. As shown in FIG. 3, the position information may include Country, State/Province, County, City, District, Street, Street Number, Zip Code, Longitude/Latitude, and Route. Any of the position information mentioned in previous paragraphs or sections are also available, as are the landmarks, and variations thereof. In the example of FIG. 3, the Spouse class has full access to all of the position information, whereas the Classmate class may only view the Country, State/Province, County, and City information. Again, the access granted to each class of peer user may be preset or customizable. And, the user may even assign a custom subset of the position information to each peer user, completely bypassing the class concept. The table may be stored locally on the PND, or may be stored remotely on the server.

Using any of the above-mentioned methods for sending the predetermined subset of the position information to the peer PND, the PND may share the position information with the peer users. The PND may also send the information to the server, and the peer users may log in to the social network through a traditional computer terminal or a networked mobile device to find out where the user is, or where the user may be going, and how the user will get to where the user is going. All of these levels of the position information may be made available to the peer users through the methods of sharing the position information shown in FIG. 1 and FIG. 2. The position information is sent to the peer PND according to the class of the peer PND, or according to the class of the peer user.

Finally, regarding the class or classes each peer user is assigned to, the peer user may be assigned to the class by default automatically by the PND, or the peer user may be assigned to the class by the user. The peer user may also be assigned to multiple classes. The user may then determine to send the most possible information to the peer user assigned to multiple classes, or the user may decide to send the least possible information to the peer user assigned to multiple classes.

Compared to the prior art, which does not provide real-time or near-real-time position information based on GPS tracking, the method of sharing position information not only provides sharing of the position information with peer users, but also provides a method of abstracting the position information shared with the peer users according to classes each peer user is assigned to by the user. This allows much greater information sharing between users in social networks, allows peer users to determine quickly where other users are, and also protects user privacy when sharing position information.

Those skilled in the art will readily observe that numerous modifications and alterations of the device and method may be made while retaining the teachings of the invention.

What is claimed is:

1. A method of sharing hierarchical position information of a personal navigation device (PND) with a peer PND, the method comprising:
   the PND assigning the peer PND to a class according to user input;
   the PND receiving a request from the peer PND to share the hierarchical position information with the peer PND;
   determining the class of the peer PND;
   determining a level of the hierarchical position information corresponding to the class of the peer PND;
   the PND filtering out a piece of the hierarchical position information lower than the level to generate filtered hierarchical position information; and
   the PND sending the filtered hierarchical position information to the peer PND;
   wherein the higher the class of the peer PND is, the higher the level of the hierarchical position information the peer PND can obtain.

2. The method of claim 1, wherein the hierarchical position information comprises country, state, province, county, city, district, street, street number, zip code, longitude, or latitude corresponding to position of the PND.

3. The method of claim 2, wherein the piece of the hierarchical position information comprises the country, state, province, county, city, district, street, street number, zip code, longitude, or latitude corresponding to the position of the PND.

4. The method of claim 1, wherein the hierarchical position information comprises a current route of the PND.

5. The method of claim 1, wherein the hierarchical position information comprises a location of the PND in relation to a landmark.

6. The method of claim 5, wherein the location of the PND in relation to the landmark comprises distance between the PND and the landmark.

7. The method of claim 1, wherein the PND sending the filtered hierarchical position information to the peer PND comprises:
   the PND sending the filtered hierarchical position information to a server; and
   the server sending the filtered hierarchical position information to the peer PND.

8. The method of claim 7, further comprising:
   the peer PND sending the request to the server;
   wherein the PND receiving the request from the peer PND to share the hierarchical position information with the peer PND is the PND receiving the request from the peer PND to share the hierarchical position information with the peer PND from the server.

9. The method of claim 8, wherein determining the class of the peer PND is the server determining the class of the peer PND based on user input.

10. The method of claim 1, further comprising:
    the PND sending updated filtered hierarchical position information to the peer PND when the hierarchical position information changes.

11. The method of claim 1, further comprising:
    the PND periodically sending updated filtered hierarchical position information to the peer PND after sending the filtered hierarchical position information to the peer PND.

12. A method of sharing hierarchical position information of a personal navigation device (PND) with a peer PND, the method comprising:
    the PND assigning the peer PND to a class according to user input;
    the PND receiving a request from the peer PND to share hierarchical position information of a predetermined type of the PND with the peer PND;
    determining the class of the peer PND;
    determining a level of the hierarchical position information corresponding to the class of the peer PND; and
    the PND sending the hierarchical position information of the predetermined type to the peer PND when the level is higher than that of the predetermined type;
    wherein the higher the class of the peer PND is, the higher the level of the hierarchical position information the peer PND can obtain.

13. The method of claim 12, wherein the predetermined type comprises country, state, province, county, city, district, street, street number, zip code, longitude, or latitude corresponding to position of the PND.

14. The method of claim 12, wherein the predetermined type comprises a current route of the PND.

15. The method of claim 12, wherein the PND sending the hierarchical position information of the predetermined type to the peer PND when the level is higher than that of the predetermined type comprises:
    the PND sending the hierarchical position information to a server; and
    the server sending the hierarchical position information to the peer PND.

16. The method of claim 15, further comprising:
    the peer PND sending the request to the server;
    wherein the PND receiving the request from the peer PND to share the hierarchical position information of the predetermined type with the peer PND is the PND receiving the request from the peer PND to share the hierarchical position information of the predetermined type with the peer PND from the server.

17. The method of claim 16, wherein determining the class of the peer PND is the server determining the class of the peer PND.

18. The method of claim 12, further comprising:
    the PND sending updated hierarchical position information of the predetermined type to the peer PND when the hierarchical position information changes.

19. The method of claim 12, further comprising:
    the PND periodically sending updated hierarchical position information of the predetermined type to the peer PND after sending the hierarchical position information of the predetermined type to the peer PND.

* * * * *